US011945087B2

(12) United States Patent
Lee

(10) Patent No.: US 11,945,087 B2
(45) **Date of Patent: *Apr. 2, 2024**

(54) IMPACT TOOL HEAD

(71) Applicant: Tien-I Industrial Co., Ltd., Taichung (TW)

(72) Inventor: Larry Lee, Taichung (TW)

(73) Assignee: TIEN-I INDUSTRIAL CO., LTD., Taichung (TW)

( * ) Notice: Subject to any disclaimer, the term of this patent is extended or adjusted under 35 U.S.C. 154(b) by 694 days.

This patent is subject to a terminal disclaimer.

(21) Appl. No.: 17/145,609

(22) Filed: Jan. 11, 2021

(65) Prior Publication Data

US 2021/0129308 A1 May 6, 2021

Related U.S. Application Data

(63) Continuation-in-part of application No. 16/370,022, filed on Mar. 29, 2019, now abandoned.

(51) Int. Cl.
*B25D 17/08* (2006.01)

(52) U.S. Cl.
CPC ...... *B25D 17/08* (2013.01); *B25D 2217/0042* (2013.01); *B25D 2250/051* (2013.01); *B25D 2250/235* (2013.01); *B25D 2250/321* (2013.01)

(58) Field of Classification Search
CPC ............ B25D 17/08; B25D 2217/0042; B25D 2250/051; B25D 2250/235; B25D 2250/321; B25D 2217/0034; B25D 17/02
USPC ................... 173/90–118, 127, 200–204, 211
See application file for complete search history.

(56) References Cited

U.S. PATENT DOCUMENTS

| | | | | | |
|---|---|---|---|---|---|
| 1,305,311 | A * | 6/1919 | Sheldon et al. | F16B 21/02 279/93 |
| 1,888,685 | A * | 11/1932 | Norling | B25D 17/08 279/81 |
| 2,453,536 | A | 6/1947 | Peck | |
| 2,547,224 | A | 4/1951 | MacGuire | |
| 3,334,693 | A | 8/1967 | Badcock | |
| 3,666,022 | A | 5/1972 | Bailey et al. | |
| 5,119,667 | A | 6/1992 | Hollis | |
| 6,171,312 | B1 | 1/2001 | Beaty | |
| 6,223,834 | B1 * | 5/2001 | Takamura | B25B 21/02 173/93.5 |
| 9,044,847 | B2 | 6/2015 | Kohlschmied | |
| 9,776,253 | B2 * | 10/2017 | Suruga | B23B 31/005 |

(Continued)

FOREIGN PATENT DOCUMENTS

| | | |
|---|---|---|
| TW | I468268 B | 1/2015 |
| TW | M507829 U | 9/2015 |

*Primary Examiner* — Robert F Long
(74) *Attorney, Agent, or Firm* — MUNCY, GEISSLER, OLDS & LOWE, P.C.

(57) ABSTRACT

An impact tool head is provided, configured to be disposed on an impact tool, the impact tool head including: a rod body and a flange radially protruding from the rod body, the rod body including a working end portion, the flange including an inclined surface facing toward the working end portion and an outermost peripheral edge, a contact position being defined as a position where the inclined surface configured to be contact with at least one projection of the impact tool; wherein as viewed along the axial direction, a distance between the contact position and the outermost peripheral edge is larger than or equal to 0.5 mm.

9 Claims, 6 Drawing Sheets

(56) References Cited

U.S. PATENT DOCUMENTS

| | | | | |
|---|---|---|---|---|
| 10,507,568 | B2 * | 12/2019 | Phan | E02F 3/966 |
| 10,688,633 | B2 * | 6/2020 | Lee | B25G 1/063 |
| 11,305,411 | B2 * | 4/2022 | Lee | B25D 17/08 |
| 2004/0007261 | A1 | 1/2004 | Cornwell | |
| 2005/0072600 | A1 * | 4/2005 | Kleine | B25D 17/088 175/320 |
| 2005/0110225 | A1 * | 5/2005 | Kleine | B25D 17/088 279/19 |
| 2005/0217901 | A1 | 10/2005 | Hedlund et al. | |
| 2007/0158089 | A1 * | 7/2007 | Chen | B25D 9/18 173/128 |
| 2010/0084451 | A1 | 4/2010 | Abla | |
| 2010/0300715 | A1 | 12/2010 | Storm et al. | |
| 2010/0326688 | A1 | 12/2010 | Ullrich et al. | |
| 2011/0108299 | A1 | 5/2011 | Wei | |
| 2012/0118597 | A1 | 5/2012 | Hauptmann | |
| 2012/0247797 | A1 | 10/2012 | Wei | |
| 2012/0267138 | A1 | 10/2012 | Fuenfer | |
| 2013/0048460 | A1 | 2/2013 | Keller et al. | |
| 2013/0056235 | A1 | 3/2013 | Pozgay et al. | |
| 2013/0081838 | A1 * | 4/2013 | Tully | B25B 23/1453 173/168 |
| 2013/0319712 | A1 | 12/2013 | Massler | |
| 2014/0190715 | A1 | 7/2014 | Wong et al. | |
| 2015/0129248 | A1 | 5/2015 | Nitsche et al. | |
| 2020/0230795 | A1 * | 7/2020 | Carlson | B25C 1/047 |

* cited by examiner

IMPACT TOOL HEAD

The present invention is a CIP of application Ser. No. 16/370,022, filed Mar. 29, 2019, the entire contents of which are hereby incorporated by reference.

BACKGROUND OF THE INVENTION

Field of the Invention

Description of the Prior Art

Impact tools are widely used in engineering operations such as building construction or vehicle maintenance. The types of impact tools include power type and manual type. The tool head such as that in TWI468268 or TWM507829, is usually detachably and removably connected to the impact tool, and can be replaced according to different operation requirements. The conventional impact tool is provided with a connecting head, the tool head is provided with a radial flange that can be blocked by a retaining mechanism (such as a steel ball) to restrict the tool head. The tool head and the connecting head can be stably connected as their radial dimensions match with each other. However, after long-term use, the radial flange is easily deformed by repeated impact of the retaining mechanism, thereby expanding the radial dimension of the radial flange or changing the shape of the radial flange so that the connecting head can be stuck in the connecting head, which results in inconvenience in use.

The present invention is, therefore, arisen to obviate or at least mitigate the above-mentioned disadvantages.

SUMMARY OF THE INVENTION

The main object of the present invention is to provide an impact tool head which can avoid being stuck due to deformation.

To achieve the above and other objects, the present invention provides an impact tool head, configured to be disposed on an impact tool, the impact tool head including a rod body and a flange radially protruding from the rod body, the rod body including a working end portion, the flange including an inclined surface facing toward the working end portion and an outermost peripheral edge, a contact position being defined as a position where the inclined surface configured to be contact with at least one projection of the impact tool; wherein as viewed along the axial direction, a distance between the contact position and the outermost peripheral edge is larger than or equal to 0.5 mm.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
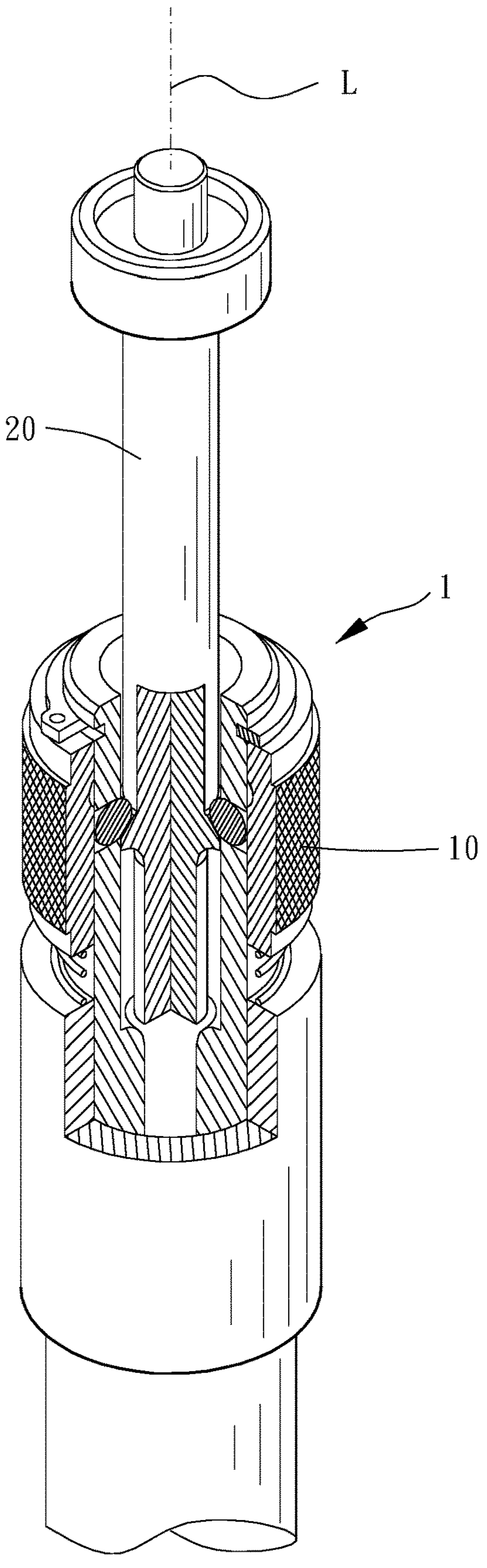
FIG. 1 is a stereogram of a preferable embodiment of the present invention.
Figure 2:
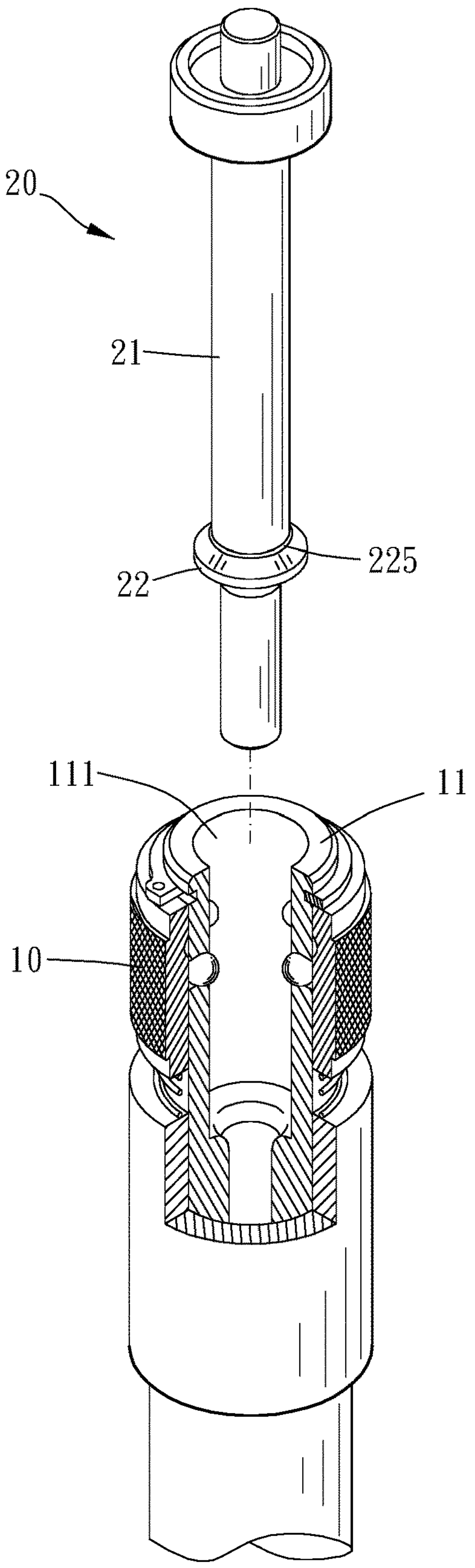
FIG. 2 is a breakdown drawing of a preferable embodiment of the present invention.
Figure 4:
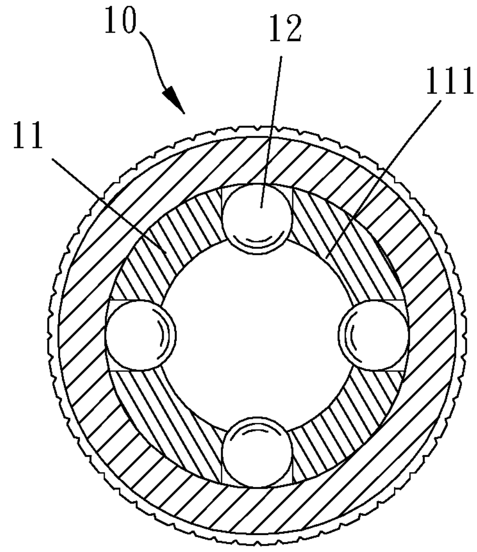
FIG. 4 is a cross-sectional view, taken along the line A-A in FIG. 3.
Figure 3:
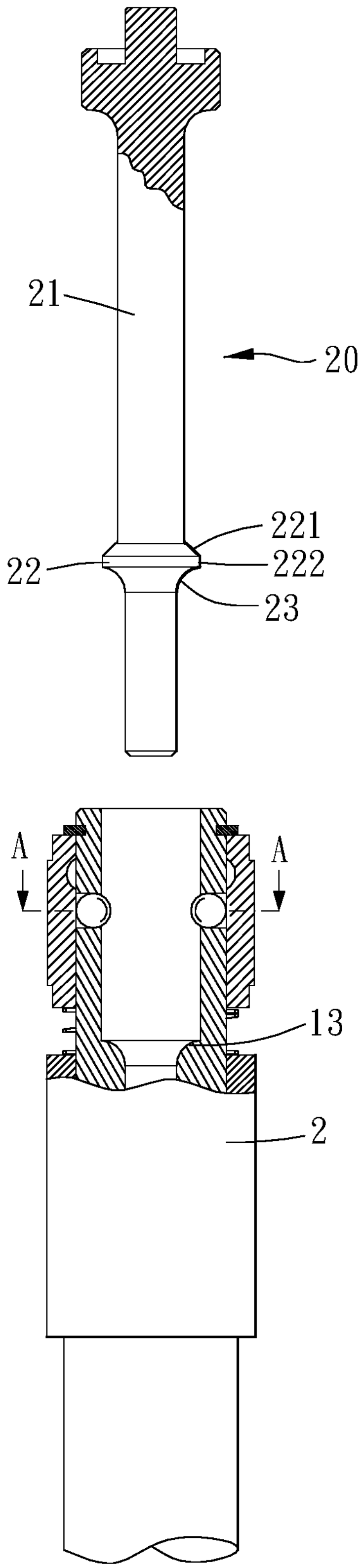
FIG. 3 is a partial cross-sectional view of a preferable embodiment of the present invention.
Figure 5:
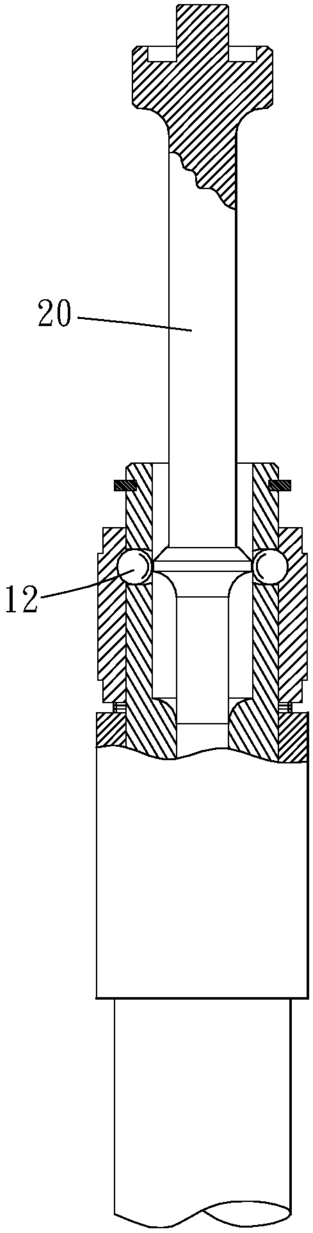
FIGS. 5 and 6 are views showing operation of a preferable embodiment of the present invention.
Figure 6:
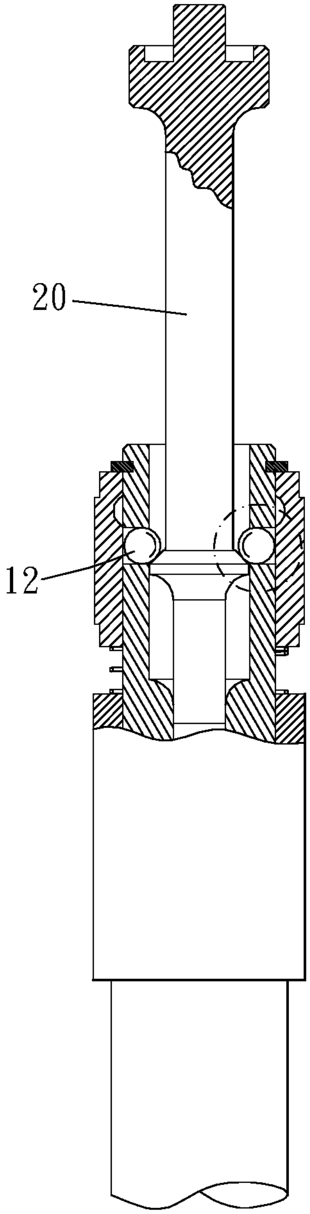
Figure 7:
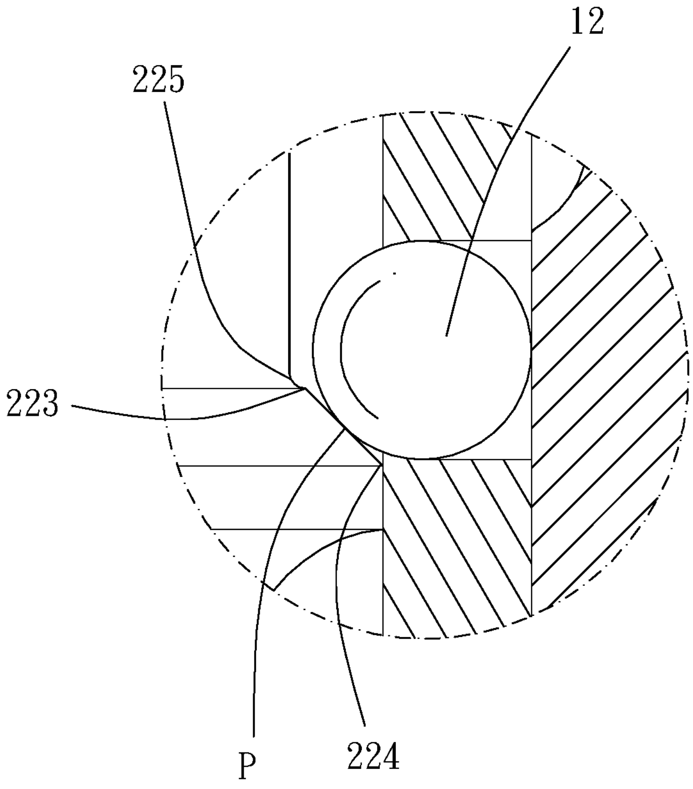
FIG. 7 is a partial enlargement of FIG. 6.

Please refer to FIGS. 1 to 9 for a preferable embodiment of the present invention. An impact tool head assembling mechanism 1 includes an engaging sleeve 10 and an impact tool head 20.

The engaging sleeve 10 is disposed on a front end of an impact tool 2 and includes a tubular wall 11 and at least one projection 12. The tubular wall 11 defines an axial direction L, and the at least one projection 12 is protrudingly and retractably disposed on an inner face 111 of the tubular wall 11; the impact tool head 20 includes a rod body 21 and a flange 22 radially protruding from the rod body 21, the flange 22 includes an inclined surface 221 facing toward the front end and an outermost peripheral edge 222, and a contact position P is defined as a position where the inclined surface 221 contact with the at least one projection 12; wherein as viewed along the axial direction L, a distance between the contact position P and the outermost peripheral edge 222 is larger than or equal to 0.5 mm. Whereby, the flange 22 cannot be stuck by the tubular wall 11 due to radial deformation of the flange 22.

Figure 9:
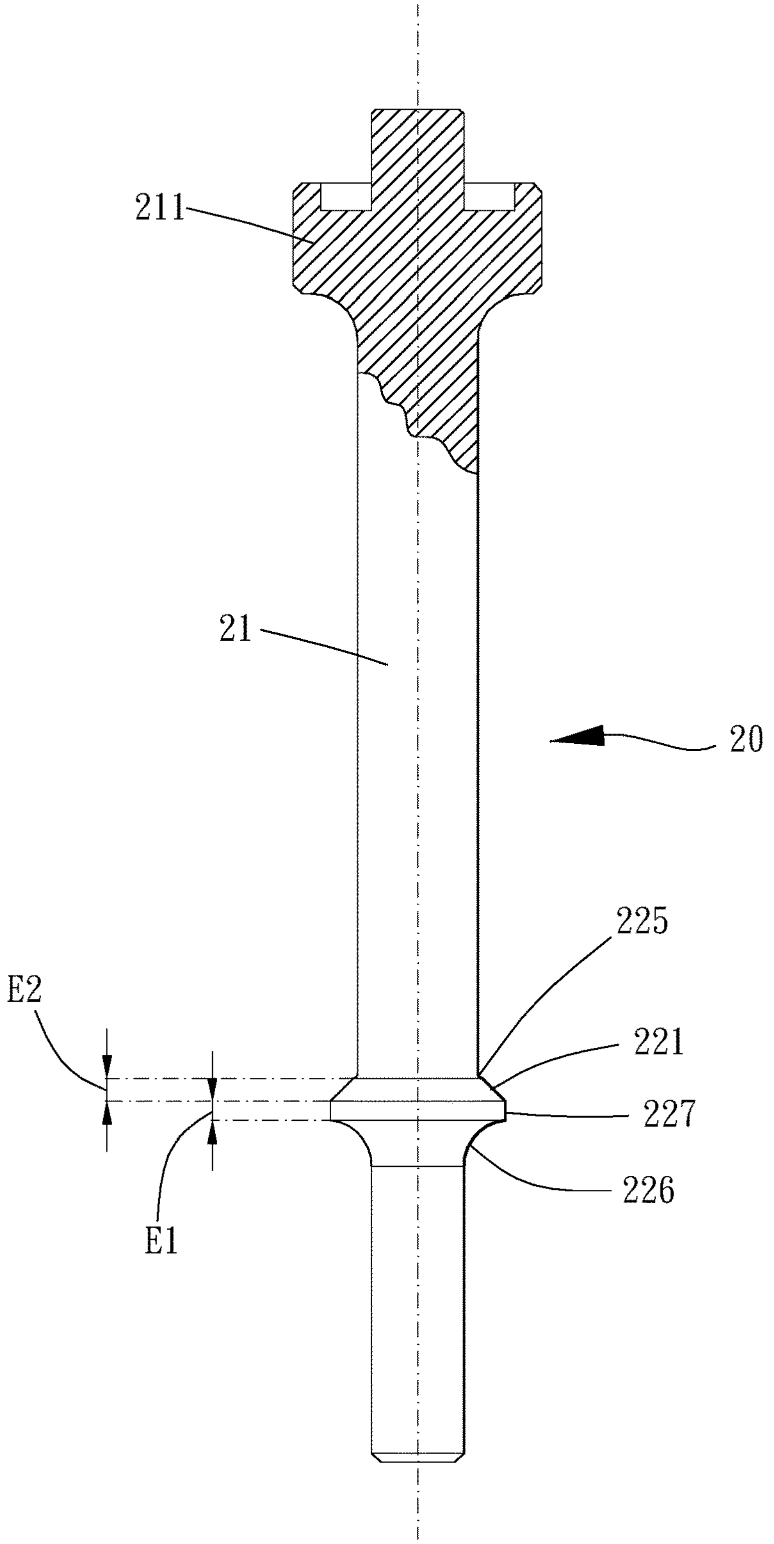
FIG. 9 is a partial cross-sectional view of an impact tool head of a preferable embodiment of the present invention.

Specifically, the rod body 21 includes a working end portion 211, and the working end portion 211 may be configured as a flat chisel head, point chisel head, rivet impact head, or the like. The inclined surface 221 faces toward the working end portion 211. The flange 22 further includes a circumferential surface 227 which is parallel to the axial direction L and transitionally connected with the inclined surface 221 so as to provide guiding effect during assembling. In the axial direction L, an extending distance E1 of the circumferential surface 227 is smaller than or equal to an extending distance E2 of the inclined surface 221 (as shown in FIG. 9) so as to have good structural strength. Preferably, the outermost peripheral edge 222 is disposed on the circumferential surface 227 so that deformation of the inclined surface 221 has no influence on movement of the flange 22.

Figure 8:
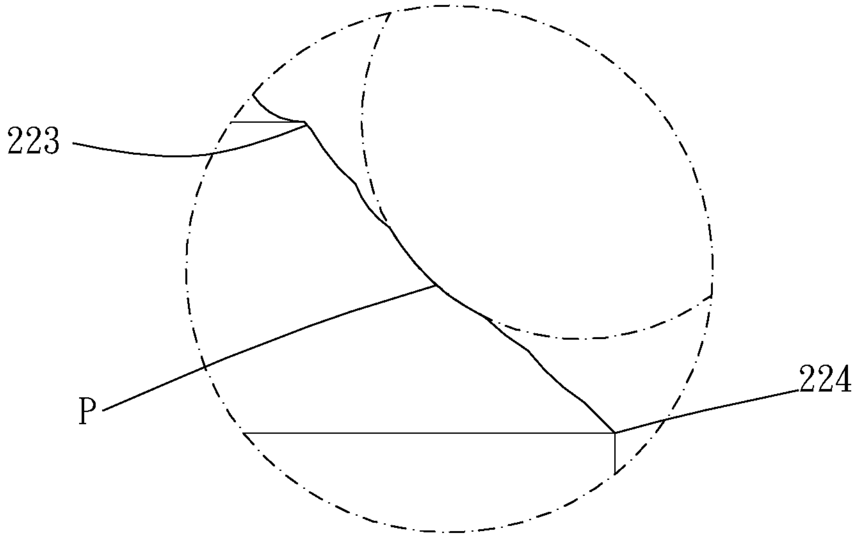
FIG. 8 is a view showing a partial enlargement of an impact tool head with impacted dents.

In this embodiment, the inclined surface 221 is flat and has a slope, preferably, from 0.5 to 3 so that there is a suitable distance between the contact position P and the outermost peripheral edge 222. The inclined surface 221 and the at least one projection 12 are preferably in point contact, and thus the contact area of the at least one projection 12 and the inclined surface 221 is small so that the impacted deformation of the flange 22 is reduced and it allows more deformation tolerance. In other embodiments, the inclined surface may be a convex surface or a concave surface. Specifically, the hardness of the at least one projection 12 (for example, HRC60) is greater than the hardness of the flange 22 (for example, HRC50), thus having good structural strength for stably abutting the flange 22; the at least one projection 12 is a ball member, the ball member has a diameter from 6 to 10 mm; the inclined surface 221 includes an upper peripheral edge 223, a distance between the upper peripheral edge 223 and the outermost peripheral edge 222 is from 1.5 to 5.0 mm; a distance between the contact position P and the outermost peripheral edge 222 is from 0.75 to 2.5 mm. When the impact tool head 20 is forced to impact outward, the ball member can contact the inclined surface 221 in a specific range of the flange 22, the inclined surface 221 can occurs within the specific range of the flange 22 so that the flange 22 cannot be stuck by the tubular wall 11, as shown in FIG. 8. The inclined surface 221 includes a lower peripheral edge 224, a distance between the lower peripheral edge 224 and the contact position P is less than or equal to 0.75 mm, and the lower peripheral edge 224 and the outermost peripheral edge 222 are preferably distanced from each other so as to prevent the inclined surface 221 from deformation and from interference with the tubular wall 11. As viewed in the axial direction L, at least one third of the at least one projection 12 overlaps the inclined surface 221 so that the impact tool head 20 can be stably supported and so that the contact position P is distanced from the tubular wall 11 in a sufficient gap so as to allow more deformation tolerance. In this embodiment, the engaging sleeve 10 includes a plurality of said projections 12 which are peripherally separately disposed on the inner face 111, the inclined surface 221 and a respective one of the plurality of said projections 12 are in point contact, thus stably abutting against the impact tool head 20 on the same level or plane. Preferably, the impact tool head 20 further includes a first arcuate concave surface 225 between the rod body 21 and the inclined surface 221, and the first arcuate concave surface 225 has a first radius of curvature less than or equal to 5 mm. In this embodiment, the first radius of curvature of 2.5 mm, which provides a short path for efficient force transmission. Moreover, the impact tool head 20 further includes a second arcuate concave surface 226 between the rod body 21 and a side of flange 22 opposite to the inclined surface 221, and the second arcuate concave surface 226 has a second radius of curvature which is larger than the first radius of curvature so as to have good force transmission effect.

The engaging sleeve 10 further includes a receiving hole 13 expanding toward the front end, and the impact tool head 20 further includes an abutting surface 23 receivable within the receiving hole 13. A shape of the abutting surface 23 and a shape of the receiving hole 13 are complementary with each other so that the impact tool head 20 and the receiving hole 13 fittingly contact each other and is not easy to be damaged and so that the force transmission is efficient. Fittingly contact of the impact tool head 20 and the receiving hole 13 each other provides large contact area for distributing force on the impact tool 2, and the abutting surface 23 facilities assembling of the flange 22 to move past the at least one projection 12.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An impact tool head configured to be disposed on an impact tool, the impact tool head including: a rod body and a flange radially protruding from the rod body, the rod body including a working end portion, the flange including an inclined surface facing toward the working end portion and an outermost peripheral edge, a contact position being defined as a position where the inclined surface configured to be contact with at least one projection of the impact tool;

wherein as viewed along the axial direction, a distance between the contact position and the outermost peripheral edge is larger than or equal to 0.5 mm;

wherein the inclined surface is configured to be in point contact with the at least one projection; the inclined surface includes an upper peripheral edge, a distance between the upper peripheral edge and the outermost peripheral edge is from 1.5 mm to 5.0 mm; a distance between the contact position and the outermost peripheral edge is from 0.75 mm to 2.5 mm.

2. The impact tool head of claim 1, wherein the inclined surface is flat a linear surface.

3. The impact tool head of claim 2, wherein the inclined surface has a slope from 0.5 to 3.0.

4. The impact tool head of claim 1, wherein the inclined surface is a convex surface or a concave surface.

5. The impact tool head of claim 1, wherein the flange further includes a circumferential surface which is parallel to the axial direction and transitionally connected with the inclined surface, and in the axial direction, an extending distance of the circumferential surface is smaller than or equal to an extending distance of the inclined surface.

6. The impact tool head of claim 1, further including a first arcuate concave surface between the rod body and the inclined surface, wherein the first arcuate concave surface has a first radius of curvature less than or equal to 5 mm.

7. The impact tool head of claim 3, wherein the flange further includes a circumferential surface which is parallel to the axial direction and transitionally connected with the inclined surface, and in the axial direction, an extending distance of the circumferential surface is smaller than or equal to an extending distance of the inclined surface; the impact tool head further includes a first arcuate concave surface between the rod body and the inclined surface, and the first arcuate concave surface has a first radius of curvature less than or equal to 5 mm; the impact tool head further includes a second arcuate concave surface between the rod body and a side of flange opposite to the inclined surface, and the second arcuate concave surface has a second radius of curvature which is larger than the first radius of curvature.

8. The impact tool head of claim 1, wherein as viewed in the axial direction, the inclined surface is configured to be overlapped with at least one third of the at least one projection when the impact tool head is disposed on the impact tool.

9. The impact tool head of claim 1, wherein the inclined surface includes a lower peripheral edge, and a distance between the lower peripheral edge and the contact position is less than or equal to 0.75 mm.

* * * * *